3,328,706
STAIRCASE WAVE FORM GENERATOR
Milton H. Greenfield, Howard Beach, and Anthony Abajian, Glen Oaks, N.Y., assignors, by mesne assignments, to the United States of America as represented by the Secretary of the Navy
Filed Jan. 27, 1965, Ser. No. 430,510
6 Claims. (Cl. 328—186)

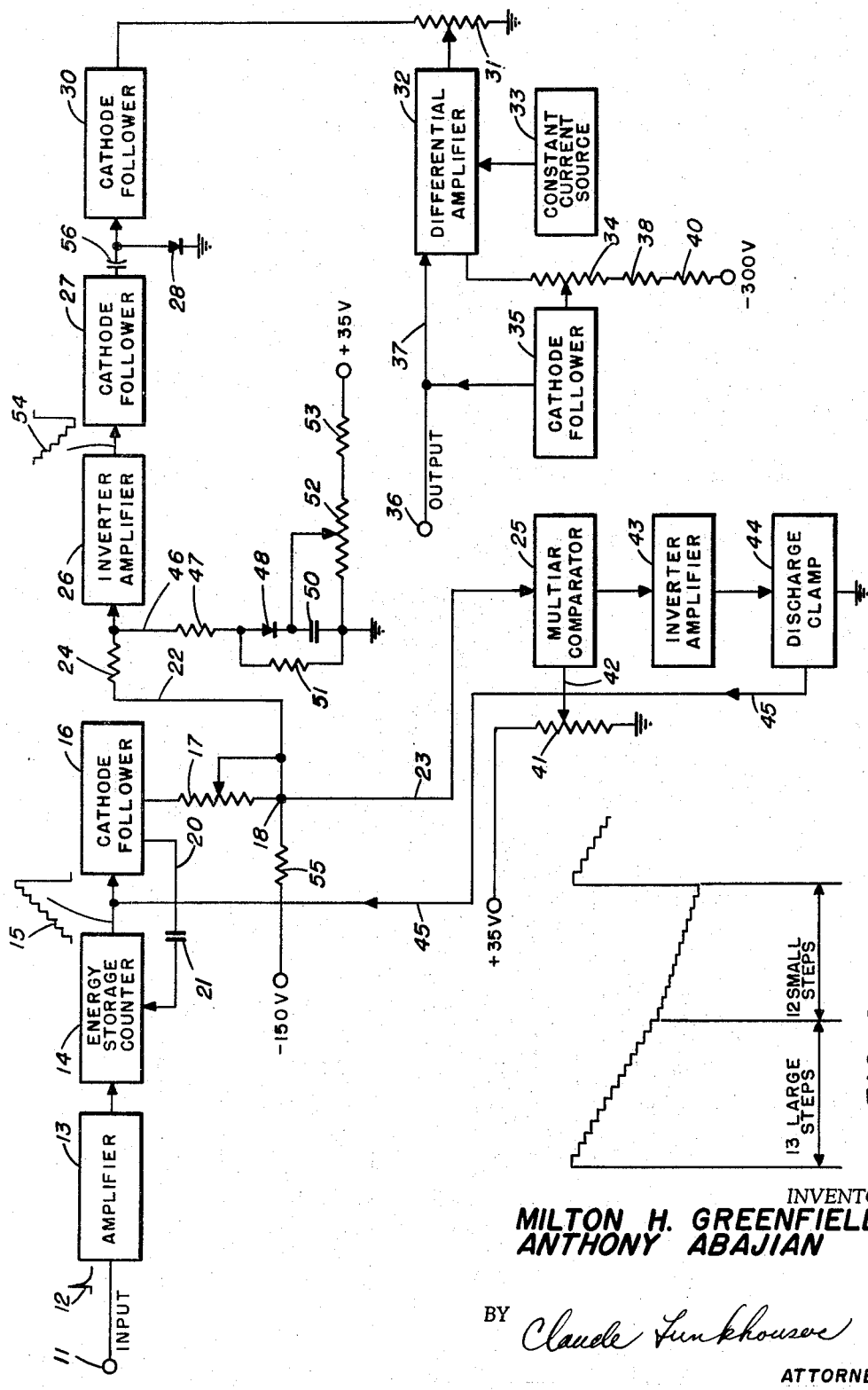

ABSTRACT OF THE DISCLOSURE

The present invention is a step wave generator in which the number of steps in each cycle is fixed and in which a first group of steps are of one particular amplitude and the remaining steps are of another amplitude. Step amplitude is controlled by a biased diode in the shunt branch of a voltage divider which conducts when the waveform reaches an amplitude corresponding to the first number of steps, thereby attenuating the amplitude of the succeeding steps.

---

The present invention relates to a wave form generator and more particularly to a wave form generator which produces a staircase wave in which the number of steps in each cycle is fixed but wherein the amplitude of the steps diminishes after a predetermined number of larger steps.

Wave form generators which produce staircase waves have many applications. Some well-known examples are for use in checking the linearity of vertical deflection circuits, and as frequency dividers. They may also be used in the presentation of non-linear bar graph displays as well as in non-linear counting and non-linear function generation. An outstanding use of the present invention, however, is in the simulation of radar antenna elevation positional signals, wherein the circuit is used in an elevation sweep generator that produces simulated elevation test signals in a radar simulator.

Typically, prior art staircase wave form generators, or counters, receive uniform pulse trains, each pulse representing a unit to be counted. Circuits then produce a voltage proportional to the number of pulses received. Wave form generators of this type usually charge a capacitor through a unilateral conducting device such that the charge on the capacitor is increased slightly during the time of each pulse thereby producing a staircase, or series of steps, for the voltage wave form. When the output voltage reaches a predetermined value, representing a predetermined number of input pulses, a discharge circuit is activated to discharge and reset the capacitor.

Early design of these devices had the disadvantages that the capacitor must be discharged relatively quickly, preferably within the period of each input pulse, and also that the successive steps were not of uniform height since they had a tendency to diminish as the capacitor was charged. Additionally, the amplitude of the individual increments was not easily and quickly adjusted.

The present invention overcomes the above-noted disadvantages and offers a highly improved wave form generator which produces staircase steps that decrease in amplitude at a uniform rate and which are readily adjustable to any desired amplitude.

The present invention has the further novelty of disclosing a wave form generator which produces an output which not only consists of a wave of a fixed number of steps each cycle, but it is one wherein the amplitude of the steps diminishes after a predetermined number of larger steps have been produced as a portion of this fixed number per cycle. These new results are accomplished through the application of a novel diode-resistor-condenser network, as will be more fully described hereinafter.

An object of the invention is the provision of a wave form generator which produces an output in the form of staircase steps.

Another object of the invention is the provision of a wave form generator which provides staircase steps, each of which are of a uniform duration.

Another object of the invention is the provision of a wave form generator which provides staircase steps which are adjustable in amplitude.

Still another object is the provision of a wave form generator which will provide steps which diminish in amplitude after a predetermined number of larger steps have been provided.

Yet another object of the invention is the provision of a wave form generator which can be used in an elevation sweep generator to produce simulated elevation test signals in a radar simulator.

Other objects, advantages and novel features of the invention will become apparent from the following detailed description of the invention when considered in conjunction with the accompanying drawings wherein:

FIG. 1 shows a schematic of the circuit making up the present invention; and

FIG. 2 is a chart of typical output wave forms produced by the invention.

Referring now to the drawings wherein like parts have like numerals throughout the several figures, there is shown in FIG. 1 an input terminal 11 for receiving positive trigger pulses, such as that shown at 12. Connected to the input terminal 11 and receiving signals therefrom is an amplifier 13, which is connected in turn to a conventional energy storage counter 14. The energy storage counter 14 may be of any well-known configuration, such, for example, as a "bucket" capacitor circuit wherein the charge on a relatively large capacitor is increased by relatively small, recurring, pulses so that the charge on energy storage counter 14 takes the form of an increasing staircase, as shown by the wave form 15.

The output from energy storage counter 14 passes through a cathode follower stage, such as 16, on through a potentiometer 17 to a junction 18 on the far side of potentiometer 17. The output from the cathode follower 16 is likewise fed over a parallel output lead 20 through a coupling capacitor 21, back to energy storage counter 14 to serve as a negative feedback link as will be described hereinafter.

From the junction 18 the signal divides, going along leads 22 and 23 to a resistor 24 on one hand, and to a multiar comparator 25 on the other. From resistor 24 the signal is fed to an inverter amplifier 26 and then through a cathode follower 27. The output lead of cathode follower 27 is A.C. coupled through coupling capacitor 56 and D.C. restored to ground by means of a unidirectional device 28. At the junction of coupling capacitor 56 and unidirectional device 28 a lead goes to another cathode follower 30, the output of which goes through a potentiometer 31 to ground.

The sliding arm of potentiometer 31 taps off a portion of the signal passing through the potentiometer and feeds it to a differential amplifier 32. The second input to differential amplifier 32 is the output of cathode follower 35. Constant current source 33 is used for common mode reflection. In normal operation differential amplifier 32 acts to compare, or subtract, the signals from potentiometer 31 and cathode follower 35, applying the difference between the two signals to a potentiometer 34 connected in series with resistor 38 and 40 to a source of negative potential. The adjustable arm of potentiometer 34 picks off a portion of the signal passing through the potentiometer and applies it through a cathode follower 35 to output terminal 36. The negative feedback loop established by means of lead 37 which connects the output of cathode follower 35 with the input of differential amplifier 32 is used to improve stability and linearity of the differential amplifier.

Returning now to junction 18 we have seen that a portion of the signal present at this point is fed along lead 23 to a multiar comparator 25. Connected between a 35 volt potential and ground is a potentiometer 41, the sliding arm of which impresses a selected voltage on multiar comparator 25 through a lead 42. The output of comparator 25 is fed to an inverter amplifier 43 and then through a discharge clamp 44 out to lead 45 where the signal is carried back to the junction of energy storage counter 14 and cathode follower 16.

At the junction between resistor 24 and inverter amplifier 26 there is joined a lead 46 which is directed toward ground by means of the series connections of a resistor 47, a unidirectional device such as a rectifier 48, and a capacitor 50. Forming a parallel path to ground, across unidirectional device 48 and capacitor 50, is another resistor 51. A voltage divider is formed by resistor 53 and potentiometer 52 connected in series between a source of positive potential and ground. The sliding arm of potentiometer 52 is connected to the junction of unidirectional device 48 and capacitor 50. Cathode resistor 55 is connected between junction 18 and a source of negative potential.

Operation of the circuit making up the subject invention is such that a conventional staircase wave generator, such as shown in FIG. 1 and whose output normally consists of a wave with a fixed number of equal voltage steps per cycle, is modified so that it produces the wave form of FIG. 2. It will be noted from FIG. 2 that the total number of steps per cycle is a fixed amount, and is shown here as 25 steps. After a predetermined number of larger steps (13 for example), the relative amplitude between the steps is diminished (as the last 12 steps). This effect is obtained by injecting a novel diode-resistor-condenser network into the circuit, as will be seen hereinafter.

Referring to FIG. 1 a positive pulse, such as 12, is applied to the input terminal 11 and impressed on amplifier 13, which is normally cut off. Under the influence of the positive pulse 12, the amplifier 13 is driven to saturation, resulting in a constant amplitude negative output which is fed to energy storage counter 14. Since the internal arrangement of the energy storage counter 14 consists, among other components, of a relative large capacitance, which is charged up by successive increments as each of the positive pulses 12 are received, the energy storage counter generates a rising staircase wave form as shown at 15. The rising waveform 15 is applied through cathode follower 16 for isolation purposes and a portion of the output from the cathode follower is fed back along lead 20 and through capacitor 21, to energy storage counter 14, thereby providing a more linear staircase wave form through the operation of negative feedback.

The output of cathode follower 16 is also applied through potentiometer 17, junction 18, and lead 23 as an input to multiar comparator 25. The sliding arm of potentiometer 17 is so adjusted that the lowest level of the staircase output from cathode follower 16 is zero volts. A unidirectional voltage is also applied as a second input to the comparator 25 through the operation of potentiometer 41 and lead 42. When the voltage level of the staircase wave form 15 is equal to the voltage picked off by the sliding arm of potentiometer 41, a negative pulse is produced at the output of comparator 25 and applied to inverting amplifier 43. The amplified, and now positive, output of amplifier 43 is then applied to a conventional discharge clamp 44 which is normally biased to cut-off. The positive pulse causes the discharge clamp 44 to conduct heavily, thereby providing a low impedance discharge path for the large capacitor in the energy storage counter 14. The counter is now ready to start a new cycle when that capacitor is fully discharged.

The regular staircase output 15 as it passes through cathode follower 16 is also applied, via junction 18, lead 22 and resistor 24, to inverting amplifier 26. Resistors 24, 47, 51 and 53 along with potentiometer 52 and diode 48 serve as a voltage divider circuit in applying the signal to amplifier 26. When the voltage level of the staircase wave form exceeds the unidirectional voltage at the wiper arm of potentiometer 52, then diode 48 conducts and bypasses resistor 51. This action has the effect of attenuating the voltage on the grid of amplifier 26 by a factor which is proportional to the ratio of resistors 47 and 51.

The staircase wave form at the output of amplifier 26 has been inverted from the form it is in at junction 18, so that it now appears as a series of descending steps. Also, once resistor 51 has been short circuited by diode 48, the wave form is shaped to consist of large and small descending steps. This inverted, shaped wave form from amplifier 26 is next applied through cathode followers 27 and 30 to potentiometer 31, which is used to adjust the amplitude of the steps of the wave form.

The output of potentiometer 31 is applied as one input to differential amplifier 32 while constant current source 33 provides a constant current through the cathode circuit of amplifier 32. The output of differential amplifier 32 is fed to a voltage divider consisting of potentiometer 34 in series with fixed resistors 38 and 40. The sliding arm of potentiometer 34 picks off a portion of the output of differential amplifier 32 and applies it through cathode follower 35 to output terminal 36 where it appears as the final output. The output from cathode follower 35 is also applied as negative feedback to differential amplifier 32 so as to stabilize the amplitude of the final output wave form and provide the required low output impedance.

From the above discussion it is clear that the present invention offers a novel improvement in wave form generators in that there is disclosed a wave form generator which produces an output in the form of evenly spaced staircase steps, whose amplitude can be adjusted, and a generator which provides steps, that diminish in amplitude after a predetermined number of larger steps have been produced.

Obviously many modifications and variations of the present invention are possible in the light of the above teachings. It is therefore to be understood that within the scope of the appended claims the invention may be practiced otherwise than as specifically described.

What is claimed is:
1. A wave form generator comprising
   a positive pulse whose wave form is to be altered;
   means to be charged in increments by the positive pulse;
   means for comparing the output of the means to be charged with a predetermined potential in order to determine the duration of the charging period and therefore the total number of charging increments per cycle;
   means connected to the output of the means to be charged for reducing the amplitude of the charging increments after a predetermined number of larger increments; and
   adjustable means for determining the amplitude of the charging increments.

2. The wave form generator of claim 1 wherein the means to be charged comprises an energy storage counter having a capacitor which is charged by increments.

3. The wave form generator of claim 1 wherein the means to compare the output of the means to be charged and the predetermined potential comprises a multiar comparator.

4. The wave form generator of claim 1 wherein the means to reduce the amplitude of the charging increments comprises a diode-resistor-capacitor network.

5. A wave form generator comprising
an input for receiving positive pulses whose wave form is to be altered;
energy storage means which is charged in increments by successive receipt of the positive pulses to produce a stairstep wave form at its output;
comparator means for comparing the output of the energy storage means and a predetermined potential for determining the total number of charging increments making up a cycle;
a diode-resistor-capacitor network connected to the output of the energy storage means for reducing the amplitude of the individual charging increments; and
means connected to the output of the diode-resistor-capacitor network to adjust the amplitude of the wave form.

6. A wave form generator for producing a staircase wave having a predetermined number of large steps followed by a predetermined number of smaller steps comprising
an input for receiving positive pulses whose wave form is to be altered;
energy storage means to be charged in increments by successive positive pulses;
an ascending staircase wave form at the output of the energy storage means;
a multiar comparator to receive the stairstep wave form;
an adjustable potential also applied to the comparator for comparison with the potential of the stairstep wave form, the output of said comparator determining the total number of stairsteps to be present in the wave form;
a diode-resistor-capacitor network connected to the output of the energy storage means for also receiving the stairstep wave form, the network acting to reduce the amplitude of the stairstep waveform and therefore produce a predetermined number of smaller steps in the wave form;
a differential amplifier connected to receive the stairstep wave form; and
an adjustable potential also connected to the differential amplifier for comparison with the stairstep wave form, the output of the differential amplifier determining the amplitude of the stairsteps in the wave form.

References Cited

UNITED STATES PATENTS

| | | | |
|---|---|---|---|
| 2,474,040 | 6/1949 | Day | 328—186 |
| 2,529,547 | 11/1950 | Fisher | 328—186 |

ARTHUR GAUSS, *Primary Examiner.*

J. S. HEYMAN, *Assistant Examiner.*